United States Patent [19]

Votava et al.

[11] 4,240,837

[45] Dec. 23, 1980

[54] CADMIUM GLASS HAVING LOW CADMIUM OXIDE SOLUBILITY

[75] Inventors: Werner F. Votava, Broadview Heights; Thomas W. Wonnacott, Chagrin Falls, both of Ohio

[73] Assignee: Ferro Corporation, Cleveland, Ohio

[21] Appl. No.: 111,659

[22] Filed: Jan. 14, 1980

Related U.S. Application Data

[63] Continuation-in-part of Ser. No. 926,721, Jul. 21, 1978, abandoned.

[51] Int. Cl.³ .............................. C03C 3/12; C03C 3/04
[52] U.S. Cl. ......................................... 106/48; 106/49; 106/52; 106/53; 106/54
[58] Field of Search ....................... 106/48, 49, 53, 52, 106/54

[56] References Cited

U.S. PATENT DOCUMENTS

| | | | |
|---|---|---|---|
| 2,911,312 | 11/1959 | Hoffman | 106/48 |
| 2,930,713 | 3/1960 | Hoffman | 106/48 |
| 3,326,703 | 6/1967 | Harrington | 106/52 |
| 3,443,973 | 5/1969 | Bozosh et al. | 106/49 |
| 3,527,649 | 9/1970 | Sullivan | 106/48 |
| 3,650,781 | 3/1972 | Baak | 106/54 |
| 3,859,102 | 1/1975 | Fearns et al. | 106/49 |
| 3,898,092 | 8/1975 | Rea | 106/49 |
| 3,909,277 | 9/1975 | Dube | 106/49 |
| 4,008,091 | 2/1977 | Wagner et al. | 106/48 |

Primary Examiner—O. R. Vertiz
Assistant Examiner—Mark Bell
Attorney, Agent, or Firm—Wilson, Fraser, Barker & Clemens

[57] ABSTRACT

A cadmium glass is disclosed, particularly adapted for use in fritted form, characterized in that the glass is a highly concentrated source of cadmium with relatively low cadmium oxide solubility or release, as when ingested in the human system, to render it essentially nontoxic and thereby adapted for many applications. In addition to cadmium oxide, the basic glass comprises titania, zirconia, alumina, and silica. A chief use for the nontoxic cadmium glass is as a stabilizer for inorganic red or yellow glazes. Cadmium oxide solubilities as low as 0.0% are possible, depending on particle size of the ground glass.

8 Claims, No Drawings

CADMIUM GLASS HAVING LOW CADMIUM OXIDE SOLUBILITY

CROSS-REFERENCE TO RELATED APPLICATIONS

This application is a continuation-in-part of an application, Ser. No. 926,721, filed July 21, 1978, now abandoned.

BACKGROUND OF THE INVENTION

Cadmium has long been used as an ingredient of glass, including fritted glass. One important use of cadmium fritted glass is as a stabilizer for inorganic red or yellow glazes, that is, to prevent such glazes from burning out and discoloring at elevated temperatures. For example, cadmium sulfide yellow and cadmium sulfoselenide red are two pigments that can be mixed with low melting base frit or glasses, applied to ceramic or glass bodies, and then fired to provide colored glazes ranging from brilliant yellow through orange and red to maroon.

To provide temperature stable yellow to red glazes containing cadmium sulfide and/or cadmium sulfoselenide as a color carrier, it has been the practice to form a base frit and a color frit in which the color frit contains the cadmium, sulfur, and/or selenium compounds. U.S. Pat. Nos. 3,527,649 to Sullivan and No. 4,008,091 to Wagner et al relate to processes for producing cadmium-containing glazes.

In the course of producing cadmium glazes, and in the actual use of cadmium bearing glasses, many workers necessarily must handle the glasses or otherwise become exposed to them.

There is a growing concern about possible cadmium poisoning due to ingested material or inhaled dust of a cadmium-containing glass, especially in finely divided frit form, or due to direct contact with a cadmium-containing glass. If there is, in fact, such a danger, it is heightened by the relative ease in which cadmium oxide is dissolved or leached from a glassy matrix, and this of course is a function of its solubility in the environment of use. Waste water may readily become contaminated from cadmium-soluble glasses in industrial processes. However, a greater danger apparently resides in the ingestion of cadmium-containing glasses in the human system where significant solubility of cadmium oxide, as in stomach acid, could produce a toxic effect.

SUMMARY OF THE INVENTION

A principal object of the invention is to provide a nontoxic, highly concentrated, source of cadmium for use in ceramic, glass, and other applications where cadmium is required or desired as a component. A further object is to provide a nontoxic cadmium glass from which cadmium oxide has relatively low solubility, particularly when ingested in the human system. A still further object is to provide such a glass that may be handled by workers with reasonable safety, particularly in using the cadmium glass in powdered form as a stabilizer for inorganic red or yellow glazes.

The weight glass comprises in weight percent about:

| | |
|---|---|
| CdO | 42% to 46% |
| $TiO_2$ | 0.0% to 30% |
| $ZrO_2$ | 0.0% to 30% |
| $SiO_2$ | 10% to 60% |
| $Al_2O_3$ | 0.0% to 10% |

The glass may contain additionally various fluxing agents, such as SrO, PbO, CaO, $Li_2O$, ZnO, MgO, BaO, $Na_2O$, and still others. Preferably, in general the present glass has a cadmium oxide solubility limit of no greater than 2.0% by weight using the extraction procedure of the Brimsdown Method. However, solubilities as low as 0.0% are possible for glasses apt to be ingested in a human system.

As one use, the glass can be conventionally fritted and mixed with a base glass frit to form a stabilized red or yellow glaze in a manner known in the art.

DESCRIPTION OF THE PREFERRED EMBODIMENTS

General glass compositions found useful in the present invention are given, followed by a description of one manner of using such glasses. The examples illustrate some of the specific glass compositions that may be used and include data showing the relatively low cadmium oxide solubility using the extraction procedure of the Brimsdown Method.

In general, a nontoxic cadmium glass of the present invention having a relatively low cadmium oxide solubility comprises in weight percent about:

| | |
|---|---|
| CdO | 42% to 46% |
| $TiO_2$ | 0.0% to 30% |
| $ZrO_2$ | 0.0% to 30% |
| $SiO_2$ | 10% to 60% |
| $Al_2O_3$ | 0.0% to 10% |

The use of fluxing agents facilitates the smelting of the glasses at lower temperatures than would otherwise be the case. A wide number of fluxing agents in varying amounts can be added to the general glass compositions without appreciably affecting the desired properties of the glass. One or more fluxing agent may be present in an amount from about 0.1% to about 20% by weight of the glass. Useful fluxing agents, for example, include one or more of the following in weight percent based on the weight of the glass:

| | |
|---|---|
| SrO | 0.1% to 20% |
| PbO | 0.1% to 20% |
| CaO | 0.1% to 20% |
| ZnO | 0.1% to 10% |
| Mgo | 0.1% to 10% |
| BaO | 0.1% to 10% |
| $Li_2O$ | 0.1% to 3% |
| $Na_2O$ | 0.1% to 3% |
| $K_2O$ | 0.1% to 3% |
| $B_2O_3$ | 0.1% to 3% |
| F | 0.1% to 3% | in which the source of the fluorine is a fluoride of at least one metal of the glass.

Even though lead oxide may be used as a fluxing agent, the glass does not become toxic because of the lead content. The lead oxide is also sufficiently insoluble in the present glasses that it does not present a toxicity problem by leaching or dissolving out the glasses. When the fluxing agents are used outside of the ranges given and the cadmium oxide level remains the same, the solubility of the cadmium oxide increases to an unacceptable level. The increased solubility may be due in part to the lowering of the silica level.

Desirable glass compositions useful in the present invention comprise in weight percent about:

| | |
|---|---|
| CdO | 42% to 46% |
| TiO$_2$ | 0.0% to 20% |
| ZrO$_2$ | 0.0% to 20% |
| SiO$_2$ | 25% to 50% |
| Al$_2$O$_3$ | 2% to 8% |
| Fluxing agent | 0% to 8% | the fluxing agent being selected from one or more of the following:

| | |
|---|---|
| SrO | 0.1% to 8% |
| PbO | 0.1% to 8% |
| CaO | 0.1% to 8% |
| ZnO | 0.1% to 8% |
| MgO | 0.1% to 8% |
| BaO | 0.1% to 8% |
| Li$_2$O | 0.1% to 3% |
| Na$_2$O | 0.1% to 3% |
| K$_2$O | 0.1% to 3% |
| B$_2$O$_3$ | 0.1% to 3% |
| F | 0.1% to 3% | in which the source of the fluorine is a fluoride of at least one metal of the glass.

A preferred glass comprises in weight percent about:

| | |
|---|---|
| CdO | 42.0% to 46.0% |
| TiO$_2$ | 2.0% |
| ZrO$_2$ | 3.0% |
| SiO$_2$ | 32.0% to 45.0% |
| Al$_2$O$_3$ | 2.0% to 8.0% |
| CaO | 5% |

It is understood that the relative amounts of the indicated ingredients are selected to total 100%.

The previously described glass compositions may be conventionally smelted from the indicated oxides or fluorides either directly or from compounds which during the heat of the smelt are converted to such oxides or fluorides. For example, the cadmium component can be cadmium oxide itself or obtained from such cadmium salts as cadmium carbonate, cadmium nitrate, cadmium chloride, cadmium sulfate, and the like.

The cadmium component may be directly smelted into the glass during its initial formation, or the cadmium may be added as an addition and sintered into the glass after the glass, minus the cadmium has been smelted and fritted. When incorporated as an addition, the cadmium is preferably used as the oxide. Fritting of the glass, either before and after the addition of the cadmium component, is by convention means, such as by passing a stream of molten glass between the fritting rollers or by quenching the stream in cold water. The resulting frit can be ground as by ball milling, to a desired average particle size.

While the cadmium glasses may be used whenever cadmium is required or desired as a component, the present glasses find excellent utility as stabilizers for inorganic red or yellow glazes. A cadmium glass in fritted form is mixed with one or more other frits, especially glaze frits, which may, for instance, contain sulphur and/or selenium in some available form. When mixed frits are fired at an elevated temperature, cadmium sulfide and/or cadmium sulfoselenide forms and an integral inorganic red or yellow glaze results.

Cadmium oxide solubilities of the glasses were determined using the extraction procedure of the Brimsdown Method. This is an extraction test described in "Ceramic Glazes" by Felix Singer and W. L. German, published by Borax Consolidated Limited, London, 1960, at page 108, appendix 12. A weighed amount of powdered glass to be tested is placed in a container and a given volume of a 0.25% aqueous solution of hydrochloric acid added. The container is continuously agitated for one hour in standard shaker equipment providing a constant shaking force. The container is set aside for one hour. The solution is then filtered and the filtrate tested for the percent of cadmium oxide present based on the weight of the original sample.

The Brimsdown Method of extraction is designed to simulate the action of stomach acid in ingested materials. On pages 26 and 27 of the above cited reference it is stated that "hydrochloric acid in the gastric juices is actually 0.17% but the figure 0.25% is arrived at to compensate for the fact that the acid in the body is at blood temperature."

In general, glasses having a cadmium oxide solubility no greater than about 2.0% represent an improvement and can be used for certain applications. However, for most applications, lower solubilities are recommended such as less than 1.0%. A highly desirable range possible with the present glasses is from about 0.0% to 0.5% cadmium oxide solubility and from 0.0% to about 0.5% where the glass is apt to be ingested in a human system.

The following examples illustrate the invention and should not be construed as imposing limitations on the claims. Where oxide compositions of glasses are given, they are by weight percent.

EXAMPLES 1 THROUGH 6

| Example | 1 | 2 | 3 | 4 | 5 | 6 |
|---|---|---|---|---|---|---|
| CaO | 5.3 | — | 4.8 | 4.7 | 3.4 | 5.0 |
| BaO | — | 5.1 | — | — | — | — |
| CdO | 45.7 | 45.6 | 45.6 | 45.6 | 45.7 | 44.6 |
| Al$_2$O$_3$ | 6.4 | 6.1 | 5.8 | 5.7 | 6.0 | 6.1 |
| SiO$_2$ | 40.5 | 38.2 | 36.9 | 36.1 | 37.7 | 39.3 |
| ZrO$_2$ | — | 3.0 | 2.9 | 6.1 | 3.0 | 3.0 |
| TiO$_2$ | 2.1 | 2.0 | 4.0 | 1.8 | 1.9 | 2.0 |
| F | — | — | — | — | 2.3 | — |
| | 100.0 | 100.0 | 100.0 | 100.0 | 100.0 | 100.0 |

EXAMPLES 7 THROUGH 16

These examples illustrate useful glass compositions having cadmium oxide solubilities less than 1.%:

| Example | 7 | 8 | 9 | 10 | 11 |
|---|---|---|---|---|---|
| CaO | 5.0 | — | 1.8 | 5.0 | 5.0 |
| SrO | — | 5.1 | — | — | — |
| CdO | 45.7 | 46.6 | 45.7 | 45.6 | 45.5 |
| Al$_2$O$_3$ | 3.0 | 6.2 | 6.3 | 5.1 | 4.0 |
| SiO$_2$ | 41.3 | 39.0 | 39.8 | 39.3 | 40.3 |
| ZrO$_2$ | 3.0 | 3.1 | 3.2 | 3.0 | 3.0 |
| TiO$_2$ | 2.0 | — | 2.0 | 2.0 | 2.0 |
| F | — | — | 1.2 | — | — |
| | 100.0 | 100.0 | 100.0 | 100.0 | 100.0 |

| Example | 12 | 13 | 14 | 15 | 16 |
|---|---|---|---|---|---|
| CaO | 4.0 | 5.0 | 5.0 | 5.1 | 5.0 |
| CdO | 45.7 | 43.7 | 44.6 | 44.1 | 42.6 |
| $Al_2O_3$ | 6.3 | 6.1 | 5.1 | 5.1 | 5.1 |
| $SiO_2$ | 40.0 | 40.2 | 40.3 | 40.6 | 42.3 |
| $ZrO_2$ | 2.4 | 3.0 | 3.0 | 3.1 | 3.0 |
| $TiO_2$ | 1.6 | 2.0 | 2.0 | 2.0 | 2.0 |
|  | 100.0 | 100.0 | 100.0 | 100.0 | 100.0 |

EXAMPLES 17 THROUGH 20

These examples illustrate still further glass compositions having cadmium oxide solubilities of 0.0%.

| Example | 17 | 18 | 19 | 20 |
|---|---|---|---|---|
| $K_2O$ | — | — | — | Trace |
| $Na_2O$ | — | — | — | Trace |
| $Li_2O$ | — | — | — | 1.1 |
| CaO | 5.0 | — | — | Trace |
| SrO | — | 5.0 | — | — |
| PbO | — | — | 4.9 | — |
| CdO | 45.7 | 45.7 | 45.7 | 45.6 |
| $Al_2O_3$ | 6.1 | 6.1 | 6.1 | 6.5 |
| $SiO_2$ | 38.2 | 38.2 | 38.3 | 41.3 |
| $ZrO_2$ | 3.0 | 3.0 | 3.0 | 3.3 |
| $TiO_2$ | 2.0 | 2.0 | 2.0 | 2.2 |
|  | 100.0 | 100.0 | 100.0 | 100.0 |

The above listed solubility results were obtained based on glass ground 95% through 200 mesh, U.S. Standard sieve. The cadmium release of some of the others listed previously would also be lower and approach 0.0% when ground to a coarser particle size.

Any of the foregoing glasses of the present invention can be added to other glass frit compositions to meet diverse requirements, such as a stabilizer for glazes. It is very unexpected for glasses having cadmium oxide contents of 42% to 46% to have such relatively low cadmium oxide solubilities. Because of these low solubilities, the cadmium oxide contents of the present glasses do not appreciably dissolve or accumulate if ingested in a human digestive system but pass through the system. In addition, the contamination of waste water with cadmium from industrial processing of glass and glass products is appreciably reduced.

Although the foregoing describes several embodiments of the present invention, it is understood that the invention may be practiced in still other forms within the scope of the following claims.

We claim:

1. A cadmium glass having relatively high percentage of cadmium oxide and relatively low cadmium oxide solubility, said glass consisting essentially of in weight percent about:

| CdO | 42% to 46% |
|---|---|
| $TiO_2$ | 0.0% to 30% |
| $ZrO_2$ | 0.0% to 30% |
| $SiO_2$ | 10% to 60% |
| $Al_2O_3$ | 0.0% to 10% | said glass having a CdO solubility no greater than about 2.0% as determined by using the extraction procedure of the Brimsdown Method.

2. The cadmium glass of claim 1 in which said glass is in powdered form adapted to be used as a stabilizer for glazes.

3. The cadmium glass of claim 1 containing from about 0.1% to about 20% by weight of a fluxing agent, said agent consisting essentially of in approximate weight percent one or more of the following based on the weight of the glass:

| SrO | 0.1% to 20% |
|---|---|
| PbO | 0.1% to 20% |
| CaO | 0.1% to 20% |
| ZnO | 0.1% to 10% |
| MgO | 0.1% to 10% |
| BaO | 0.1% to 10% |
| $Li_2O$ | 0.1% to 3% |
| $Na_2O$ | 0.1% to 3% |
| $K_2O$ | 0.1% to 3% |
| $B_2O_3$ | 0.1% to 3% |
| F | 0.1% to 3% | in which the source of said fluorine is a fluoride of at least one metal of said glass.

4. The cadmium glass of claim 1 in which said glass has a cadmium oxide solubility no greater than about 1.0% as determined by using the extraction procedure of the Brimsdown Method.

5. The cadmium glass of claim 1 in which said glass has a cadmium oxide solubility of about 0.0% to about 0.5% as determined by using the extraction procedure of the Brimsdown Method.

6. The cadmium glass of claim 1 in which said glass consists essentially of about:

| CdO | 42% to 46% |
|---|---|
| $TiO_2$ | 0.0% to 20% |
| $ZrO_2$ | 0.0% to 20% |
| $SiO_2$ | 25% to 50% |
| $Al_2O_3$ | 2% to 8% |
| Fluxing agent | 0% to 8% | said fluxing agent being selected from one or more of the following:

| SrO | 0.1% to 8% |
|---|---|
| PbO | 0.1% to 8% |
| CaO | 0.1% to 8% |
| ZnO | 0.1% to 8% |
| MgO | 0.1% to 8% |
| BaO | 0.1% to 8% |
| $Li_2O$ | 0.1% to 3% |
| $Na_2O$ | 0.1% to 3% |
| $K_2O$ | 0.1% to 3% |
| $B_2O_3$ | 0.1% to 3% |
| F | 0.1% to 3% | in which said source of said fluorine is a fluoride of at least one metal of said glass.

7. The cadmium glass of claim 1 in which said glass comprises in weight percent about:

| CdO | 42.0% to 46.0% |
|---|---|
| $TiO_2$ | 2.0% |
| $ZrO_2$ | 3.0% |
| $SiO_2$ | 32.0% to 45.0% |
| $Al_2O_3$ | 2.0% to 8.0% |
| CaO | 5% |

8. In a glaze composition adapted to be applied to a substrate and then fired, said glaze composition consisting essentially of a base glass frit having a stabilizer adapted to prevent the glaze from burning out or discoloring at elevated temperatures; the improvement in which said stabilizer is a cadmium glass having a relatively high percentage of cadmium oxide and relatively low cadmium oxide solubility, said cadmium glass consisting essentially in weight percent of about:

| | |
|---|---|
| CdO | 42% to 46% |
| TiO$_2$ | 0.0% to 30% |

-continued

| | |
|---|---|
| ZrO$_2$ | 0.0% to 30% |
| SiO$_2$ | 10% to 60% |
| Al$_2$O$_3$ | 0.0% to 10% | said glass having a CdO solubility no greater than about 2.0% as determined by using the extraction procedure of the Brimsdown Method.

* * * * *

UNITED STATES PATENT AND TRADEMARK OFFICE
CERTIFICATE OF CORRECTION

PATENT NO. : 4,240,837
DATED : December 23, 1980
INVENTOR(S) : Werner F. Votava et al.

It is certified that error appears in the above-identified patent and that said Letters Patent are hereby corrected as shown below:

Column 3, line 56     "convention" should be -- conventional --.

Column 4, line 33     "0.5%" should be -- 0.05% --.

Column 4, line 63     "45.5" should be -- 45.7 --.

Signed and Sealed this

Seventh Day of April 1981

[SEAL]

Attest:

RENE D. TEGTMEYER

Attesting Officer     Acting Commissioner of Patents and Trademarks